US012790450B2

(12) United States Patent
Lee et al.

(10) Patent No.: US 12,790,450 B2
(45) Date of Patent: Nov. 10, 2026

(54) POLYFLUORENE-BASED CROSS-LINKED COPOLYMER, METHOD FOR PRODUCING SAME, AND ANION EXCHANGE MEMBRANE FOR ALKALINE FUEL CELL USING SAME

(71) Applicant: IUCF-HYU (INDUSTRY-UNIVERSITY COOPERATION FOUNDATION HANYANG UNIVERSITY), Seoul (KR)

(72) Inventors: Young Moo Lee, Seoul (KR); Chuan Hu, Seoul (KR); Jong Hyeong Park, Seoul (KR); Nanjun Chen, Seoul (KR)

(73) Assignee: IUCF-HYU (INDUSTRY-UNIVERSITY COOPERATION FOUNDATION HANYANG), Seoul (KR)

( * ) Notice: Subject to any disclaimer, the term of this patent is extended or adjusted under 35 U.S.C. 154(b) by 647 days.

(21) Appl. No.: 18/268,455

(22) PCT Filed: Dec. 9, 2021

(86) PCT No.: PCT/KR2021/018580
§ 371 (c)(1),
(2) Date: Jun. 20, 2023

(87) PCT Pub. No.: WO2022/131665
PCT Pub. Date: Jun. 23, 2022

(65) Prior Publication Data
US 2024/0317951 A1 Sep. 26, 2024

(30) Foreign Application Priority Data
Dec. 18, 2020 (KR) ........................ 10-2020-0178394
Nov. 30, 2021 (KR) ........................ 10-2021-0168177

(51) Int. Cl.
*C08J 5/22* (2006.01)
*C08G 61/12* (2006.01)
*H01M 8/103* (2016.01)
*H01M 8/1072* (2016.01)
*H01M 8/1081* (2016.01)
*H01M 8/1088* (2016.01)

(52) U.S. Cl.
CPC .......... *C08J 5/2256* (2013.01); *C08G 61/122* (2013.01); *H01M 8/103* (2013.01); *H01M 8/1072* (2013.01); *H01M 8/1081* (2013.01); *H01M 8/1088* (2013.01); *C08G 2261/124* (2013.01); *C08G 2261/228* (2013.01); *C08G 2261/3142* (2013.01); *C08G 2261/3221* (2013.01); *C08J 2365/00* (2013.01)

(58) Field of Classification Search
CPC ........... C08G 61/122; C08G 2261/124; C08G 2261/228; C08G 2261/3142; C08G 2261/3221; C08J 5/2256; C08J 2365/00; H01M 8/103; H01M 8/1072; H01M 8/1081; H01M 8/1088
See application file for complete search history.

(56) References Cited

U.S. PATENT DOCUMENTS

2011/0059385 A1* 3/2011 Kim .................... C08F 283/065
521/27
2013/0022570 A1 1/2013 Kopping et al.

FOREIGN PATENT DOCUMENTS

| | | | | | |
|---|---|---|---|---|---|
| CN | 102952265 | A | * | 3/2013 | |
| CN | 106784946 | A | | 5/2017 | |
| CN | 108164724 | A | | 6/2018 | |
| CN | 109687003 | A | | 4/2019 | |
| KR | 20120113822 | A | * | 10/2012 | .......... H01M 8/1023 |
| KR | 10-2018-0121961 | A | | 11/2018 | |
| KR | 10-2019-0023249 | A | | 3/2019 | |
| KR | 10-2020-0120603 | A | | 10/2020 | |
| KR | 10-2021-0071810 | A | | 6/2021 | |
| WO | 2019/068051 | A2 | | 4/2019 | |

OTHER PUBLICATIONS

Lee et al., "Fluorene-Based Hydroxide Ion Conducting Polymers for Chemically Stable Anion Exchange Membrane Fuel Cells" ACS Macro Lett. 2015, 4, 453-457 (Lee). (Year: 2015).*
KR 20120113822 MT (Year: 2012).*
CN 102952265 MT (Year: 2013).*
The decision of KPO to grant a Patent for Application KR 20210168177 (Year: 2024).*
Nanjun Chen, et al., "Tunable multi-cations-crosslinked poly(arylene piperidinium)-based alkaline membranes with high ion conductivity and durability", Journal of Membrane Science, vol. 588, 117120, 2019, pp. 1-10.
Nanjun Chen, et al., "Robust poly(aryl piperidinium)/N-spirocyclic poly(2,6-dimethyl-1,4-phenyl) for hydroxide-exchange membranes", Journal of Membrane Science, vol. 572, 2019, pp. 246-254.
Joel S. Olsson, et al., "Tuning poly(arylene piperidinium) anion-exchange membranes by copolymerization, partial quaternization and crosslinking", Journal of Membrane Science, vol. 578, 2019, pp. 183-195.

(Continued)

*Primary Examiner* — Alexander Usyatinsky
(74) *Attorney, Agent, or Firm* — Sughrue Mion, PLLC

(57) ABSTRACT

The present disclosure relates to a technology of synthesizing an aromatic polyfluorene-based copolymer which has a cross-linked structure, does not have an aryl ether bond in a polymer backbone and has a piperidinium group introduced in a repeating unit, and applying an anion exchange membrane prepared therefrom to an alkaline fuel cell, water electrolysis, carbon dioxide reduction, a metal-air battery, etc. According to the present disclosure, an anion exchange membrane having a cross-linked structure has superior thermal and chemical stability and mechanical properties as well as high water-holding capacity, ionic conductivity and durability, and exhibits a superior dispersed phase.

12 Claims, 11 Drawing Sheets

(56) References Cited

OTHER PUBLICATIONS

Sandip Maurya, et al., "Rational design of polyaromatic ionomers for alkaline membrane fuel cells with > 1 W $cm^{-2}$ power density", Energy & Environmental Science, 2018, pp. 1-11.
International Search Report for PCT/KR2021/018580 dated Mar. 16, 2022.

* cited by examiner

POLYFLUORENE-BASED CROSS-LINKED COPOLYMER, METHOD FOR PRODUCING SAME, AND ANION EXCHANGE MEMBRANE FOR ALKALINE FUEL CELL USING SAME

CROSS REFERENCE TO RELATED APPLICATIONS

This application is a National Stage of International Application No. PCT/KR2021/018580 filed Dec. 9, 2021, claiming priority based on Korean Patent Application No. 10-2020-0178394 filed Dec. 18, 2020 and Korean Patent Application No. 10-2021-0168177 filed Nov. 30, 2021.

TECHNICAL FIELD

The present disclosure relates to a novel polyfluorene-based cross-linked copolymer and a method for preparing the same, more particularly to a technology of synthesizing an aromatic polyfluorene-based copolymer which has a cross-linked structure, does not have an aryl ether bond in a polymer backbone and has a piperidinium group introduced in a repeating unit, and applying an anion exchange membrane prepared therefrom to an alkaline fuel cell, water electrolysis, carbon dioxide reduction, a metal-air battery, etc.

BACKGROUND ART

Polymer electrolyte membrane fuel cells (PEMFCs) have been studied a lot due to the advantages of relatively high current density and environmental friendliness. Especially, proton exchange membranes based on perfluorohydrocarbons represented by Nafion have been mainly used as the polymer electrolyte membranes. Although the Nafion membrane has superior chemical stability and high ionic conductivity, it is very costly and has a low glass transition temperature. Therefore, researches are being conducted actively to replace Nafion, including the development of aromatic hydrocarbon-based polymer electrolyte membranes, etc.

Recently, alkaline membrane fuel cells (AMFCs) that use anion exchange membranes and are operated under alkaline environment are drawing attentions. Especially, the alkaline membrane fuel cells are being researched continuously because inexpensive nonprecious metals such as nickel, manganese, etc. can be used as electrode catalysts instead of platinum and they exhibit superior performance and remarkably high cost competitiveness as compared to the polymer electrolyte membrane fuel cells.

For anion exchange membranes for application to alkaline membrane fuel cells, polymers having aryl ether main chains such as polyarylethersulfone, polyphenylether, polyetheretherketone, etc. have been mainly used. In addition, although cross-linked anion exchange membranes using hydrophobic crosslinking agents such as 1,5-dibromopentane, 1,6-dibromohexane and 1,6-hexanediamine are known, the hydrophobic anion exchange membranes have the problems of low ionic conductivity, limited flexibility, low solubility, etc. to be used for anion exchange fuel cells. In addition, because the existing anion exchange membranes are limited in terms of chemical stability (less than 500 hours in 1 M NaOH solution at 80° C.) and mechanical properties (tensile strength <30 MPa), power density is low (0.1-0.5 $Wcm^{-2}$) and battery durability is decreased when they are used for fuel cells.

Until now, an aromatic polyfluorene-based copolymer which does not have an aryl ether bond in a polymer backbone and has a piperidinium group introduced in a repeating unit and an anion exchange membrane have not been prepared, and a technology for applying the same to anion exchange fuel cells used in transportation devices, power storage devices, munitions industry, aerospace industry, etc. or water low-cost electrolysis devices for hydrogen production has not been known specifically.

Therefore, the inventors of the present disclosure have researched consistently to expand the applications of aromatic polymer-based ion exchange membranes having superior thermal and chemical stability and mechanical properties. As a result, they have synthesized an aromatic polyfluorene-based copolymer which has a cross-linked structure, does not have an aryl ether bond in a polymer backbone and has a piperidinium group introduced in a repeating unit, and have found out that an anion exchange membrane prepared therefrom has superior mechanical strength, water-holding capacity and durability. Therefore, they have noticed that they can be applied to alkaline fuel cells, water electrolysis, carbon dioxide reduction, metal-air batteries, etc. and have completed the present disclosure.

REFERENCES OF RELATED ART

Patent Documents

Patent document 1. Korean Patent Publication No. 10-2018-0121961.

Patent document 2. International Patent Publication No. WO 2019/068051.

Patent document 3. Chinese Patent Registration No. CN 106784946.

Patent document 4. Chinese Patent Registration No. CN 108164724.

DISCLOSURE

Technical Problem

The present disclosure is directed to providing a polyfluorene-based cross-linked copolymer having superior mechanical strength, water-holding capacity and durability, and an anion exchange membrane having a cross-linked structure prepared therefrom.

The present disclosure is also directed to applying the polyfluorene-based anion exchange membrane having a cross-linked structure to alkaline fuel cells, water electrolysis, carbon dioxide reduction, metal-air batteries, etc.

Technical Solution
The present disclosure provides a polyfluorene-based cross-linked copolymer, which is selected from copolymers having a cross-linked structure represented by <Chemical Formula 1> to <Chemical Formula 5>.
<Chemical Formula 1>
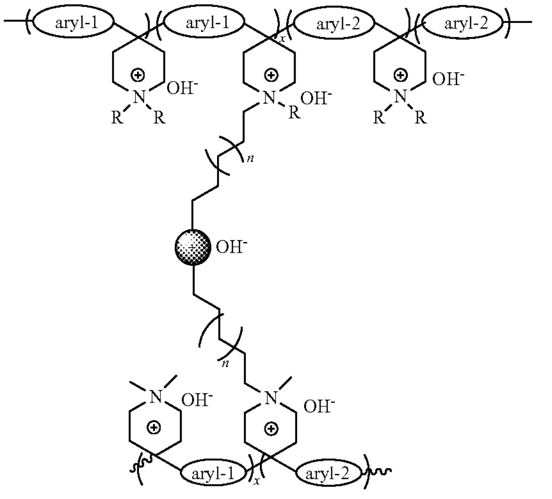
<Chemical Formula 2>
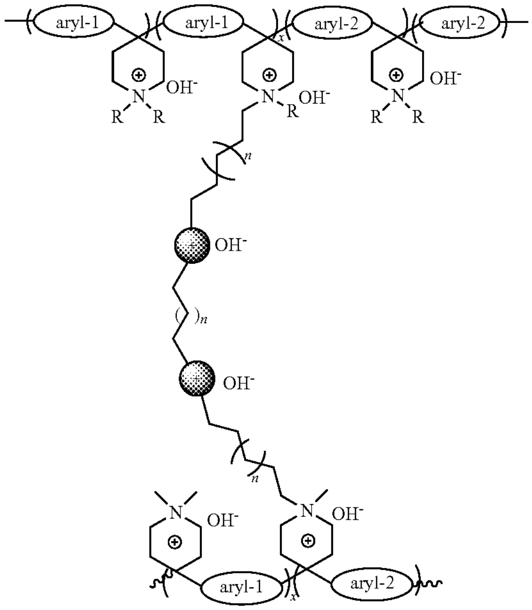
<Chemical Formula 3>
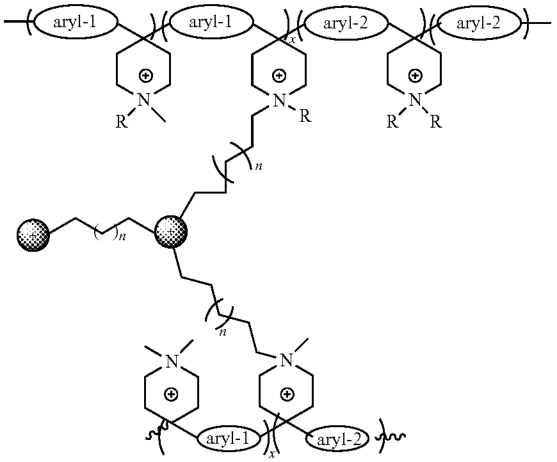
<Chemical Formula 4>
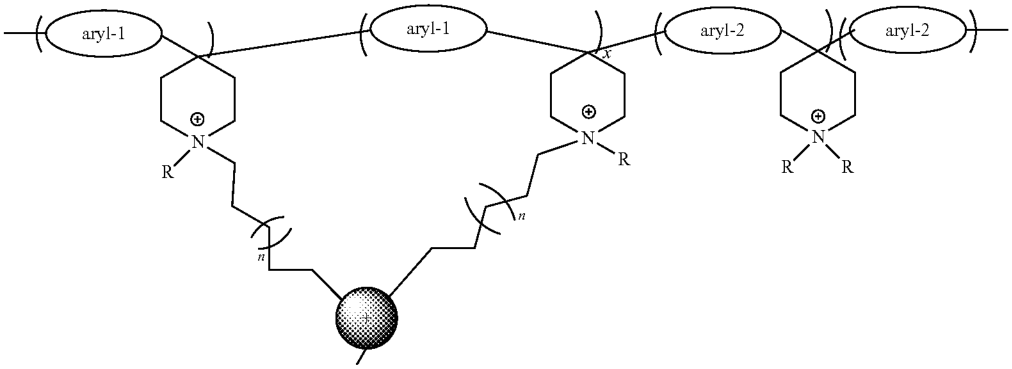

-continued
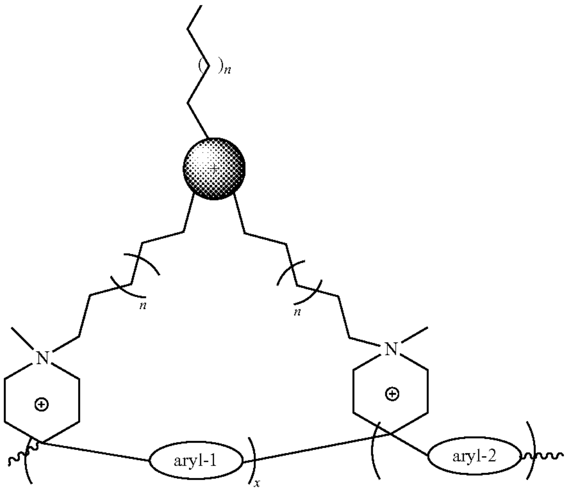
<Chemical Formula 5>
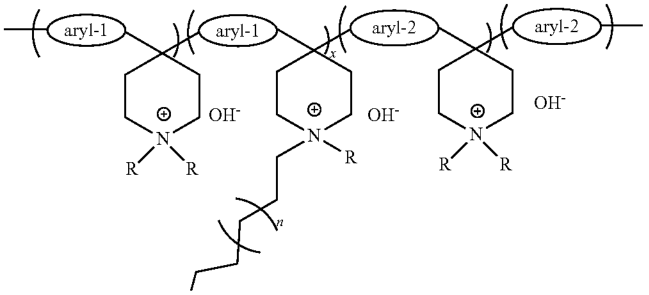
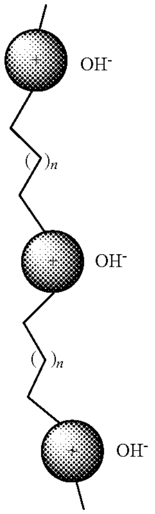
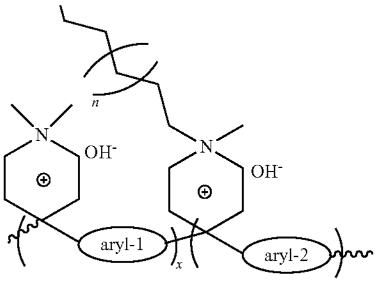

In <Chemical Formula 1> to <Chemical Formula 5>, each of aryl-1 and aryl-2 is independently selected from fluorenyl, phenyl, biphenyl, terphenyl and quaterphenyl, at least one of them being fluorenyl, R is H or $CH_3$, x indicates crosslinking degree,

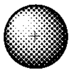

indicates an ammonium-based crosslinking agent, and n is an integer from 1 to 15.

In <Chemical Formula 1> to <Chemical Formula 5>, the x (crosslinking degree) is 5-20%.

In <Chemical Formula 1> to <Chemical Formula 5>, the

(ammonium-based crosslinking agent) is a multi-ammonium compound having at least one ammonium cation.

The present disclosure also provides a method for preparing a polyfluorene-based cross-linked copolymer, which includes: (I) a step of obtaining a polymer solution by dissolving a piperidine-introduced polyfluorene-based block copolymer in an organic solvent; (II) a step of obtaining mixture solution by adding an ammonium-based crosslinking agent solution to the polymer solution and stirring the same; (III) a step of forming a quaternary piperidinium salt by reacting the mixture solution with an excess amount of methyl iodide; and (IV) a step of obtaining a polymer in solid phase by precipitating, washing and drying the polymer solution with the quaternary piperidinium salt formed.

The organic solvent of the step (I) is N-methylpyrrolidone, dimethylacetamide, dimethyl sulfoxide or dimethylformamide.

The ammonium-based crosslinking agent of the step (II) is a multi-ammonium compound having at least one ammonium cation.

The present disclosure also provides a polyfluorene-based anion exchange membrane having a cross-linked structure, which is obtained from the polyfluorene-based cross-linked copolymer.

The present disclosure also provides a method for preparing a polyfluorene-based anion exchange membrane having a cross-linked structure, which includes: (a) a step of obtaining a polymer solution by dissolving the polyfluorene-based cross-linked copolymer in an organic solvent; (b) a step of obtaining a membrane by filtering the polymer solution, casting on a glass plate and then drying the same; and (c) a step of converting counterions to $OH^-$ ions by immersing the obtained membrane in a 1 M NaOH solution.

The organic solvent of the step (a) is N-methylpyrrolidone, dimethylacetamide, dimethyl sulfoxide or dimethylformamide.

The polymer solution of the step (a) has a concentration of 2-30 wt %. The drying of the step (b) is performed by slowly removing the organic solvent in an oven at 80-90° C. for 24 hours and then completely removing the organic solvent by heating in a vacuum oven at 120-150° C. for 24 hours.

The present disclosure also provides a membrane electrode assembly for an alkaline fuel cell, which includes the polyfluorene-based anion exchange membrane having a cross-linked structure.

The present disclosure also provides an alkaline fuel cell including the polyfluorene-based anion exchange membrane having a cross-linked structure.

The present disclosure also provides a water electrolysis device including the polyfluorene-based anion exchange membrane having a cross-linked structure.

Advantageous Effects

According to the present disclosure, an anion exchange membrane having a cross-linked structure, which is prepared from an aromatic polyfluorene-based block copolymer which has a cross-linked structure, does not have an aryl ether bond in a polymer backbone and has a piperidinium group introduced in a repeating unit, has superior thermal and chemical stability and mechanical properties as well as high water-holding capacity, ionic conductivity and durability, and exhibits a superior dispersed phase.

In addition, the polyfluorene-based anion exchange membrane having a cross-linked structure of the present disclosure may be applied to alkaline fuel cells, water electrolysis devices, carbon dioxide reduction, metal-air batteries.

BRIEF DESCRIPTION OF DRAWINGS

FIG. 5A shows the remaining ionic conductivity of anion exchange membranes prepared in Examples 1 and 3 and Comparative Example 2 after prolonged exposure to 80° C. in 1 M NaOH solutions, FIG. 5B shows 1H NMR spectrum of an anion exchange membrane prepared in Example 1 after exposure to 80° C. in a 1 M NaOH solution for 1200 hours, FIG. 5C shows the mechanical properties of the anion exchange membranes prepared in Examples 1 and 3 and Comparative Example 2 after exposure to 80° C. in 1 M NaOH solutions for 1200 hours, and FIG. 5D shows the phase separation degree of the anion exchange membranes prepared in Examples 1 and 3 and Comparative Example 2 before and after exposure to 80° C. in 1 M NaOH solutions for 1200 hours.

BEST MODE

Figure 1:
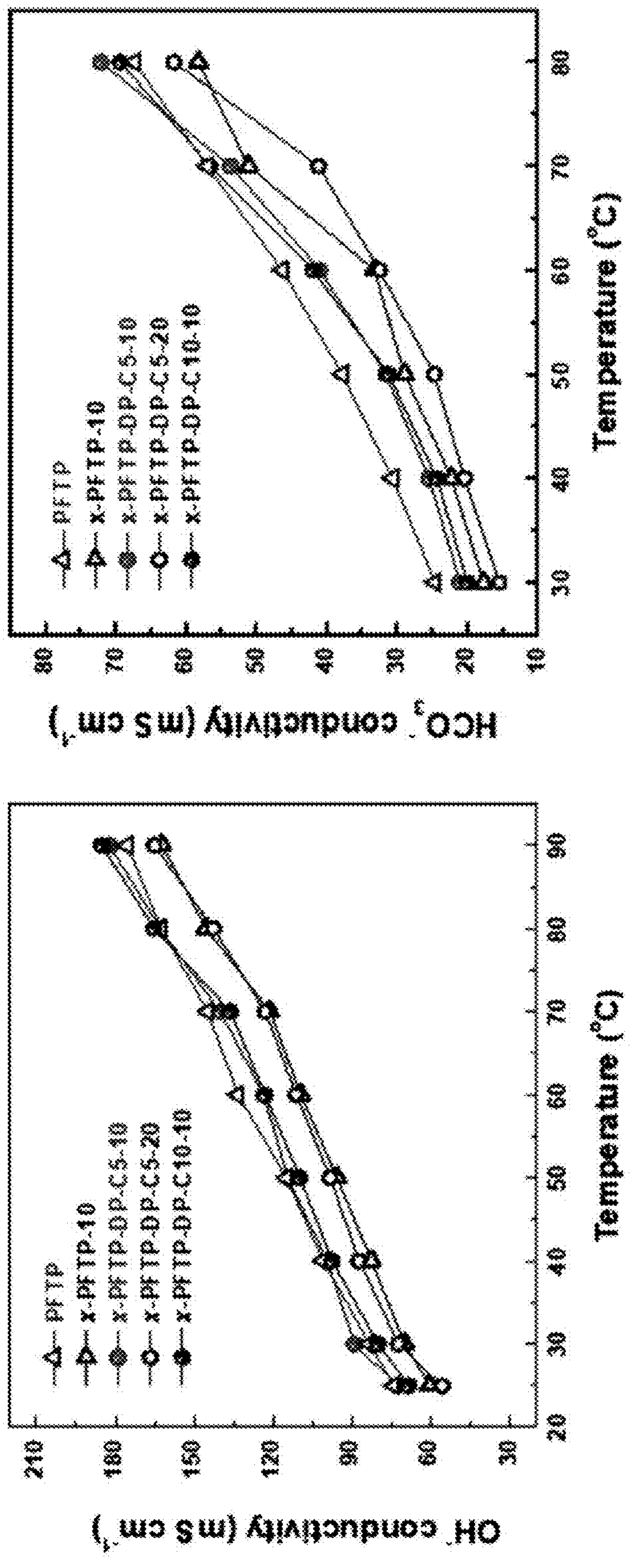
FIG. 1 shows a result of measuring the dimensional stability of anion exchange membranes prepared in Examples 1-3 and Comparative Examples 1-2.

Hereinafter, a novel polyfluorene-based cross-linked copolymer, a method for preparing the same and an anion exchange membrane for an alkaline fuel cell using the same according to the present disclosure will be described in detail.

The present disclosure provides a polyfluorene-based cross-linked copolymer, which is selected from copolymers having a cross-linked structure represented by <Chemical Formula 1> to <Chemical Formula 5>.
<Chemical Formula 1>
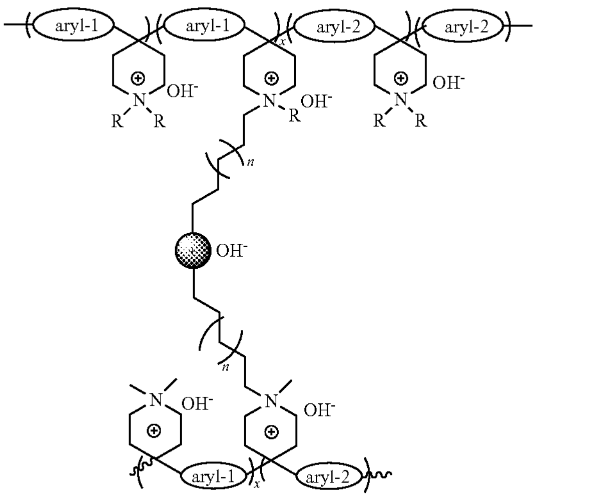
<Chemical Formula 2>
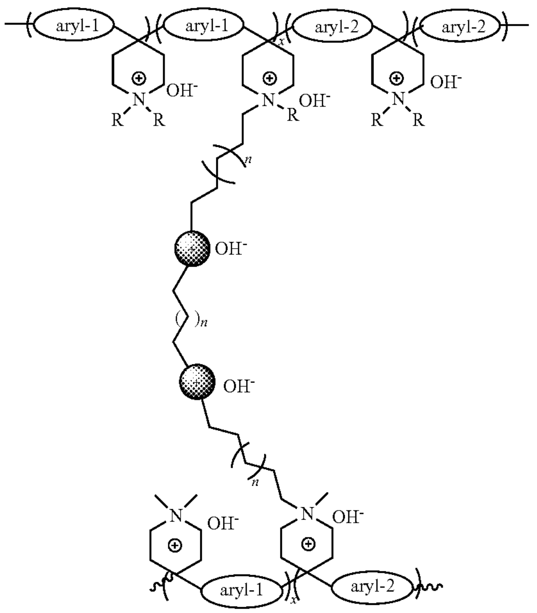
<Chemical Formula 3>
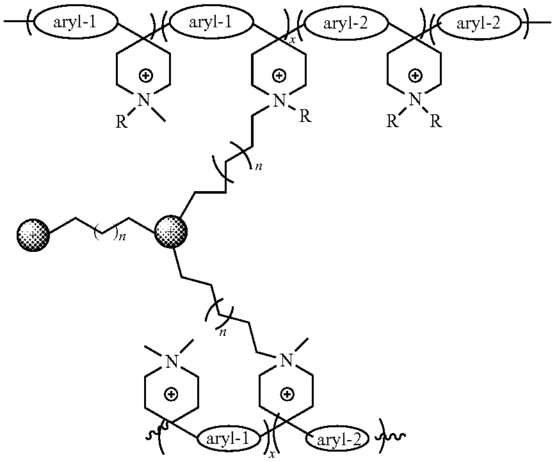
<Chemical Formula 4>
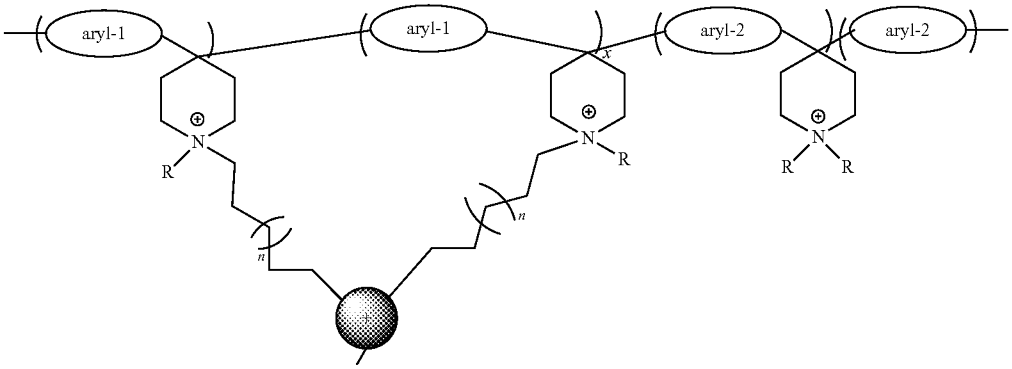

-continued
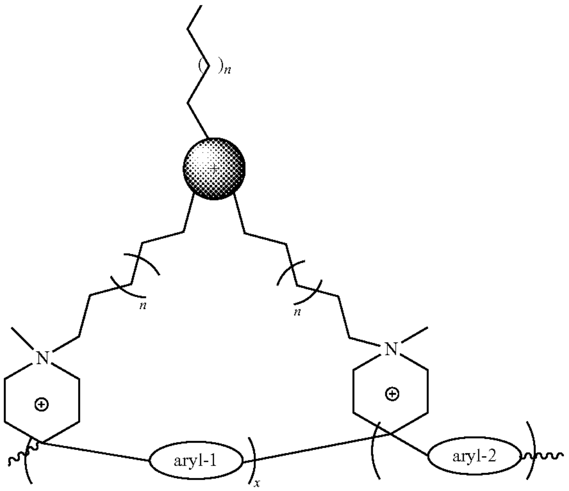
<Chemical Formula 5>
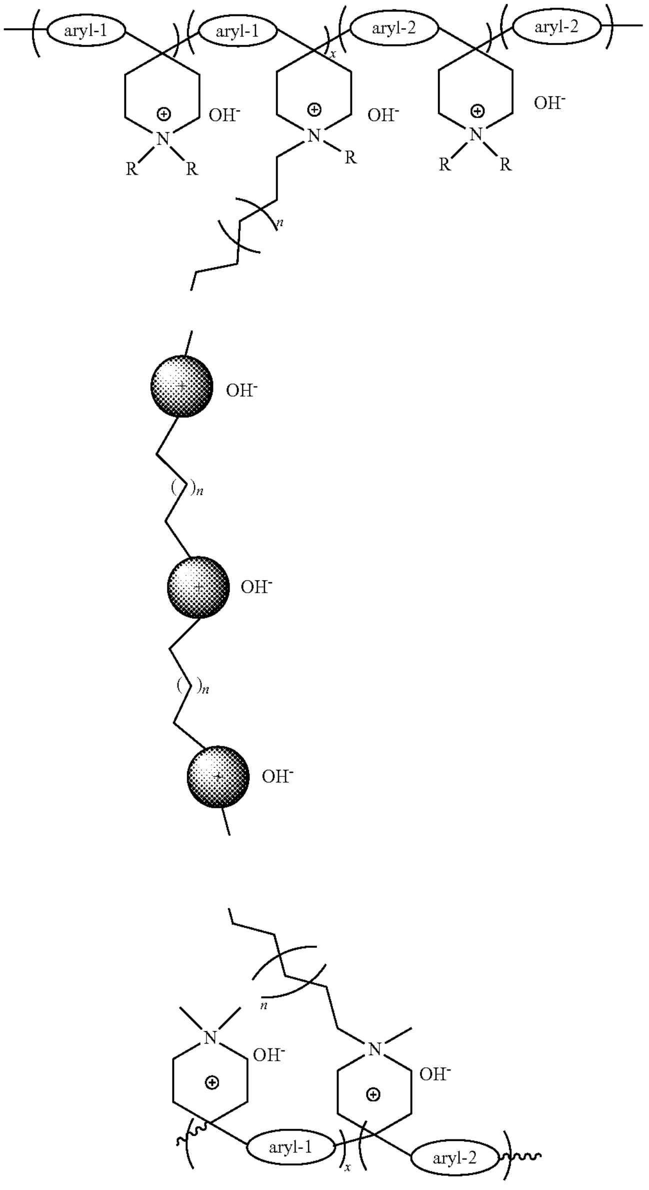

In <Chemical Formula 1> to <Chemical Formula 5>, each of aryl-1 and aryl-2 is independently selected from fluorenyl, phenyl, biphenyl, terphenyl and quaterphenyl, at least one of them being fluorenyl, R is H or $CH_3$, x indicates crosslinking degree,

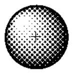

indicates an ammonium-based crosslinking agent, and n is an integer from 1 to 15.

The inventors of the present disclosure have already disclosed a novel polyfluorene-based copolymer ionomer, an anion exchange membrane and a method for preparing the same in a previously filed patent (Korean Patent Publication No. 10-2021-0071810).

In the present disclosure, a novel polyfluorene-based cross-linked copolymer having a cross-linked structure selected from those represented by <Chemical Formula 1> to <Chemical Formula 5> has been prepared by crosslinking the polyfluorene-based copolymer with a compound having at least one ammonium cation.

The inventors of the present disclosure have intended to solve the problems of low ionic conductivity, water-holding capacity and mechanical properties of the existing anion exchange membranes for alkaline fuel cells by preparing an anion exchange membrane for an alkaline fuel cell from the polyfluorene-based cross-linked copolymer.

In <Chemical Formula 1> to <Chemical Formula 5>, x indicates crosslinking degree and can be controlled with the amount of a multi-ammonium compound having at least one ammonium cation, which is used as a crosslinking agent. The crosslinking degree may be specifically 5-20%, more specifically 10-20%, when considering the anion exchange membrane that can be prepared from the cross-linked copolymer. If the crosslinking degree is lower than 5%, the improvement of physical properties through crosslinking is insignificant. And, if the crosslinking degree exceeds 20%, an anion exchange membrane cannot be prepared because the cross-linked copolymer is not completely dissolved in an organic solvent and crosslinking does not occur.

The present disclosure also provides a polyfluorene-based anion exchange membrane having a cross-linked structure, which is obtained from the polyfluorene-based cross-linked copolymer.

The polyfluorene-based anion exchange membrane having a cross-linked structure is a multi-ammonium cross-linked membrane containing at least one ammonium group. It exhibits superior film-forming ability, mechanical properties and chemical stability as it has no aryl ether bond and has N-heterocyclic ammonium and piperidinium groups such as polyphenylene, dimethylpiperidinium, etc. introduced in a repeating unit.

In addition, the ammonium-based crosslinking agent used in the present disclosure has high ionic conductivity and durability and a microphase-separated structure because it has a flexible aliphatic chain structure exhibiting superior stability and containing controllable number of ammonium groups. Furthermore, the ion exchange performance and morphology of the multi-ammonium cross-linked anion exchange membrane may be controlled by adjusting the length of alkyl spacers between the ammonium groups.

In addition, the multi-ammonium cross-linked anion exchange membrane according to the present disclosure can exhibit remarkably improved ionic conductivity and mechanical properties as compared to the anion exchange membrane with the conventional cross-linked structure, which exhibits very low ionic conductivity after crosslinking with a hydrophobic crosslinking agent.

In particular, since the multi-ammonium cross-linked anion exchange membrane according to the present disclosure exhibits high water-holding capacity even under dry environment, it can be operated stably even under low-humidity condition as compared to the existing anion exchange fuel cells. In addition, since it exhibits high water vapor permeability, it is highly advantageous in terms of material transport, moisture management and durability.

The present disclosure also provides a method for preparing a polyfluorene-based cross-linked copolymer, which includes: (I) a step of obtaining a polymer solution by dissolving a piperidine-introduced polyfluorene-based block copolymer in an organic solvent; (II) a step of obtaining mixture solution by adding an ammonium-based crosslinking agent solution to the polymer solution and stirring the same; (III) a step of forming a quaternary piperidinium salt by reacting the mixture solution with an excess amount of methyl iodide; and (IV) a step of obtaining a polymer in solid phase by precipitating, washing and drying the polymer solution with the quaternary piperidinium salt formed.

The piperidine-introduced polyfluorene-based block copolymer of the step (I) has been synthesized by the method disclosed in Korean Patent Publication No. 10-2021-0071810 by the inventors of the present disclosure.

The organic solvent of the step (I) may be N-methylpyrrolidone, dimethylacetamide, dimethyl sulfoxide or dimethylformamide, specifically dimethyl sulfoxide.

The ammonium-based crosslinking agent of the step (II) may be a multi-ammonium compound having at least one ammonium cation. Diammonium or triammonium compounds with various alkyl spacer lengths can be used. More specifically, 4,4'-(propane-diyl)bis(1-(5-bromopentyl)-1-methylpiperidinium or 4,4'-(propane-diyl)bis(1-(10-bromodecyl)-1-methylpiperidinium may be used.

The present disclosure also provides a method for preparing a polyfluorene-based anion exchange membrane having a cross-linked structure, which includes: (a) a step of obtaining a polymer solution by dissolving the polyfluorene-based cross-linked copolymer in an organic solvent; (b) a step of obtaining a membrane by filtering the polymer solution, casting on a glass plate and then drying the same; and (c) a step of converting counterions to $OH^-$ ions by immersing the obtained membrane in a 1 M NaOH solution.

The organic solvent of the step (a) may be N-methylpyrrolidone, dimethylacetamide, dimethyl sulfoxide or dimethylformamide. Specifically, dimethyl sulfoxide may be used.

Specifically, the polymer solution of the step (a) may have a concentration of 2-30 wt %. If the concentration of the polymer solution is lower than 2 wt %, film-forming ability may be decreased. And, if it exceeds 30 wt %, the physical properties of the membrane may worsen due to excessively high viscosity.

Specifically, the drying of the step (b) may be performed by slowly removing the organic solvent in an oven at 80-90° C. for 24 hours and then completely removing the organic solvent by heating in a vacuum oven at 120-150° C. for 24 hours.

Subsequently, a polyfluorene-based anion exchange membrane having a cross-linked structure with the halide form ($I^-$ form) of the polyfluorene-based cross-linked copolymer membrane converted to $OH^-$, $Cl^-$ or $CO_3^{2-}$ may be prepared by immersing the polyfluorene-based cross-linked copolymer membrane obtained through the steps (a)-(b) in a 1 M NaOH solution.

The present disclosure also provides a membrane electrode assembly for an alkaline fuel cell, which includes the polyfluorene-based anion exchange membrane having a cross-linked structure.

The present disclosure also provides an alkaline fuel cell, which includes the polyfluorene-based anion exchange membrane having a cross-linked structure.

The present disclosure also provides a water electrolysis device which includes the polyfluorene-based anion exchange membrane having a cross-linked structure.

Hereinafter, the examples and comparative examples of the present disclosure are described specifically referring to the attached drawings.

[Preparation Example] Preparation of PFTM

After adding 9,9'-dimethylfluorene (0.2914 g, 1.5 mmol) as a monomer and terphenyl (3.105 g, 13.5 mmol) and 1-methyl-4-piperidone (1.919 mL, 16.5 mmol, 1.1 eq) as comonomers to a two-necked flask, a solution was formed by adding dichloromethane (13 mL) and dissolving the monomers through stirring. After cooling the solution to 1° C., a viscous solution was obtained by slowly adding a mixture of trifluoroacetic acid (1.8 mL, ~1.5 eq) and trifluoromethanesulfonic acid (12 mL, 9 eq) to the solution and stirring the mixture for 24 hours. A poly(fluorene-co-terphenyl N-methylpiperidine) copolymer PFTM in solid form was prepared by precipitating the viscous solution with a 2 M NaOH solution, washing several times with deionized water and drying in an oven at 80° C. (yield=95%).

[Example 1] Preparation of x-PFTP-DP-C5-10 Anion Exchange Membrane

A 5 wt % polymer solution was obtained by dissolving the PFTM obtained in Preparation Example in dimethyl sulfoxide. A mixture solution was obtained by adding 4,4'-(propane-diyl)bis(1-(5-bromopentyl)-1-methylpiperidinium to the polymer solution as a crosslinking agent and stirring at 80° C. for 48 hours (crosslinking degree was adjusted to 10%). Then, a quaternary piperidinium salt was formed by adding an excess amount of methyl iodide to the mixture solution and conducting reaction for 24 hours. Next, a cross-linked copolymer in solid form was obtained by precipitating the polymer solution with the quaternary piperidinium salt formed with ethyl acetate, followed by washing and drying in a vacuum oven at 80° C. for 24 hours.

Subsequently, a 4 wt % polymer solution was obtained by dissolving the cross-linked copolymer in dimethyl sulfoxide. The obtained polymer solution was filtered with a 0.45-μm polytetrafluoroethylene (PTFE) filter and then casted on a glass plate. A polyfluorene-based anion exchange membrane having a cross-linked structure ($I^-$ form) was obtained by slowly removing the dimethyl sulfoxide by drying the cast solution at 90° C. for 24 hours and then completely removing the dimethyl sulfoxide by drying in a vacuum oven at 140° C., and it was named x-PFTP-DP-C5-10.

After detaching the obtained x-PFTP-DP-C5-10 from the glass plate and cutting into a size of 3.5 cm×3.5 cm, counterions were converted to $OH^-$ ions by immersing in a 1 M NaOH solution for 24 hours.

[Example 2] Preparation of x-PFTP-DP-C5-20 Anion Exchange Membrane

A polyfluorene-based anion exchange membrane having a cross-linked structure was prepared in the same manner as in Example 1 except that a mixture solution was obtained by adding 4,4'-(propane-diyl)bis(1-(5-bromopentyl)-1-methylpiperidinium as a crosslinking agent and stirring at 80° C. for 48 hours and that the crosslinking degree was adjusted to 20%, and it was named x-PFTP-DP-C5-20.

[Example 3] Preparation of x-PFTP-DP-C10-10 Anion Exchange Membrane

A polyfluorene-based anion exchange membrane having a cross-linked structure was prepared in the same manner as in Example 1 except that a mixture solution was obtained by adding 4,4'-(propane-diyl)bis(1-(10-bromodecyl)-1-methylpiperidinium as a crosslinking agent and stirring at 80° C. for 48 hours and that the crosslinking degree was adjusted to 10%, and it was named x-PFTP-DP-C10-10.

[Comparative Example 1] Preparation of PFTP Anion Exchange Membrane

After obtaining a polymer solution by dissolving the PFTM obtained in Preparation Example (4 g) in a mixture of dimethyl sulfoxide (40 mL) and trifluoroacetic acid (0.5 mL) as a cosolvent at 80° C., the polymer solution was cooled to room temperature. Subsequently, a quaternary piperidinium salt was formed by adding $K_2CO_3$ (2.5 g) and methyl iodide (2 mL, 3 eq) to the polymer solution and conducting reaction for 48 hours. Next, a poly(fluorene-co-terphenyl N,N-dimethylpiperidinium) copolymer in solid form was prepared by precipitating the polymer solution with ethyl acetate, followed by filtering, washing several times with deionized water and drying in a vacuum oven at 80° C. for 24 hours.

Subsequently, a 3.2 wt % polymer solution was prepared by dissolving the copolymer in dimethyl sulfoxide. Subsequently, after collecting the polymer solution with a syringe and filtering with a 0.4-μm filter, the resulting transparent solution was cast on a 14×21 cm glass plate. A polyfluorene-based anion exchange membrane without having a cross-linked structure (named PFTP) was obtained by slowly removing the solvent by drying the cast solution in an oven at 85° C. for 24 hours and then completely removing the solvent by heating in a vacuum oven at 150° C. for 24 hours. Then, counterions were converted to $OH^-$ ions by immersing in a 1 M NaOH solution for 24 hours in the same manner as in Example 1.

[Comparative Example 2] Preparation of x-PFTP-10 Anion Exchange Membrane

A polyfluorene-based anion exchange membrane having a cross-linked structure was prepared in the same manner as in Example 1 except that 1,6-dibromohexane was used as a crosslinking agent and the crosslinking degree was adjusted to 10%, and it was named x-PFTP-10.

Test Example

The mechanical properties, morphology, ion exchange performance, water uptake, expansion rate, ionic conductivity, fuel cell performance, etc. of the anion exchange membranes prepared in Examples 1-3 and Comparative Examples 1-2 were evaluated and measured by the method described in Korean Patent Publication No. 10-2021-0071810 by the inventors of the present disclosure.

FIG. 1 shows a result of measuring the dimensional stability of the anion exchange membranes prepared in Examples 1-3 and Comparative Examples 1-2.

It can be seen that the anion exchange membranes having a cross-linked structure prepared in Examples 1-3 exhibit improved ion-exchange capacity as compared to the anion exchange membrane not having a cross-linked structure, as that of Comparative Example 1, due to the crosslinking agent containing an ionic group and, therefore, exhibit slightly increased swelling while showing similar water uptake as compared to the anion exchange membrane having a conventional cross-linked structure prepared in Comparative Example 2.

Figure 2A:
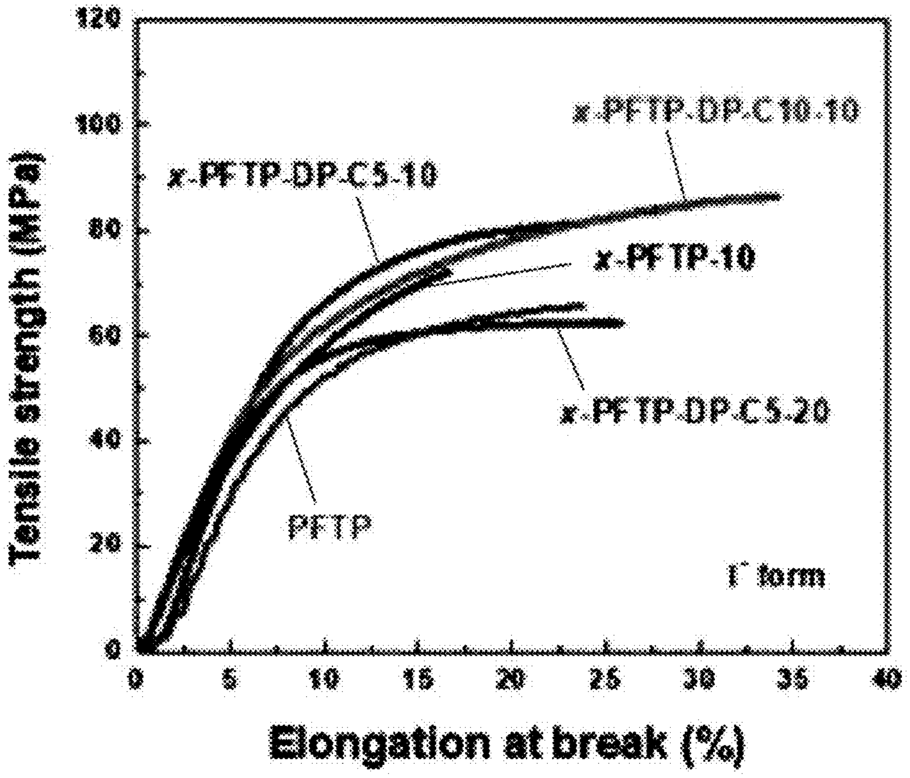
FIG. 2A shows a result of measuring the mechanical properties of anion exchange membranes prepared in Examples 1-3 and Comparative Examples 1-2 in dry state.
Figure 2B:
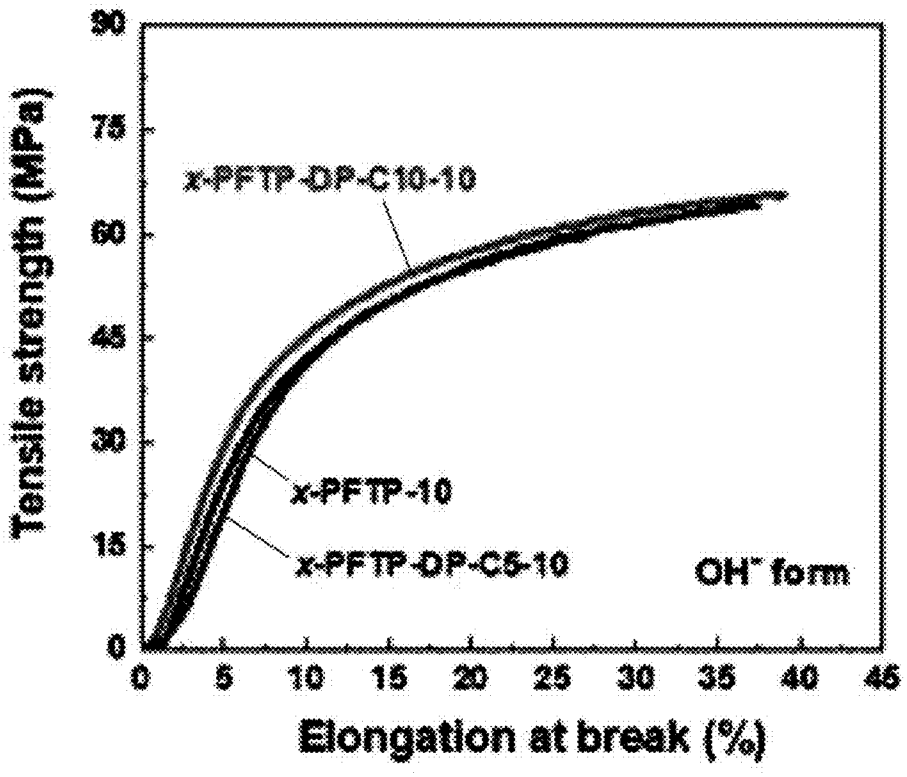
FIG. 2B shows a result of measuring the mechanical properties of the anion exchange membranes prepared in Examples 1 and 3 and Comparative Example 2 in wet state.

FIG. 2A shows a result of measuring the mechanical properties of the anion exchange membranes prepared in Examples 1-3 and Comparative Examples 1-2 in dry state, and FIG. 2B shows a result of measuring the mechanical properties of the anion exchange membranes prepared in Examples 1 and 3 and Comparative Example 2 in wet state.

It can be seen that the anion exchange membranes having a cross-linked structure have increased tensile strength and elongation as compared to the anion exchange membrane not having a cross-linked structure due to their cross-linked structures and exhibit superior mechanical properties even in wet state.

Figure 3:
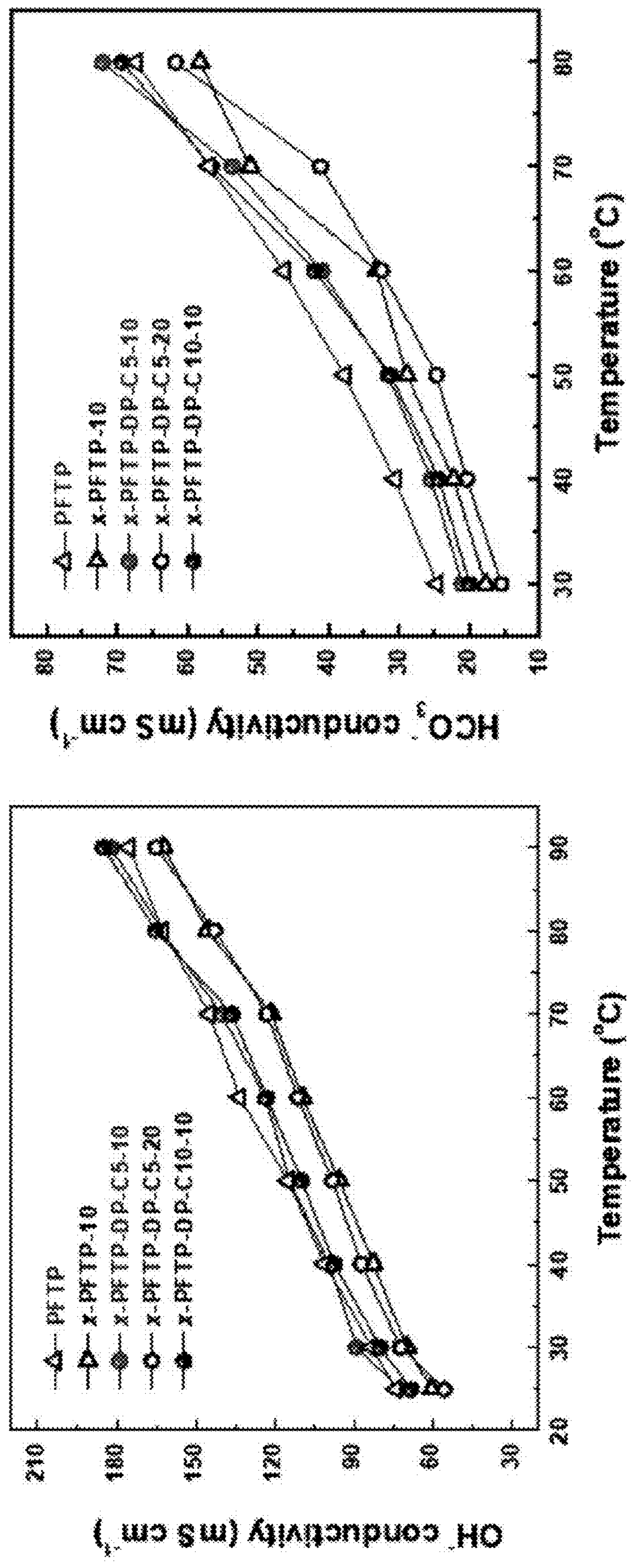
FIG. 3 shows the ionic conductivity of anion exchange membranes prepared in Examples 1-3 and Comparative Examples 1-2.
Figure 4A:
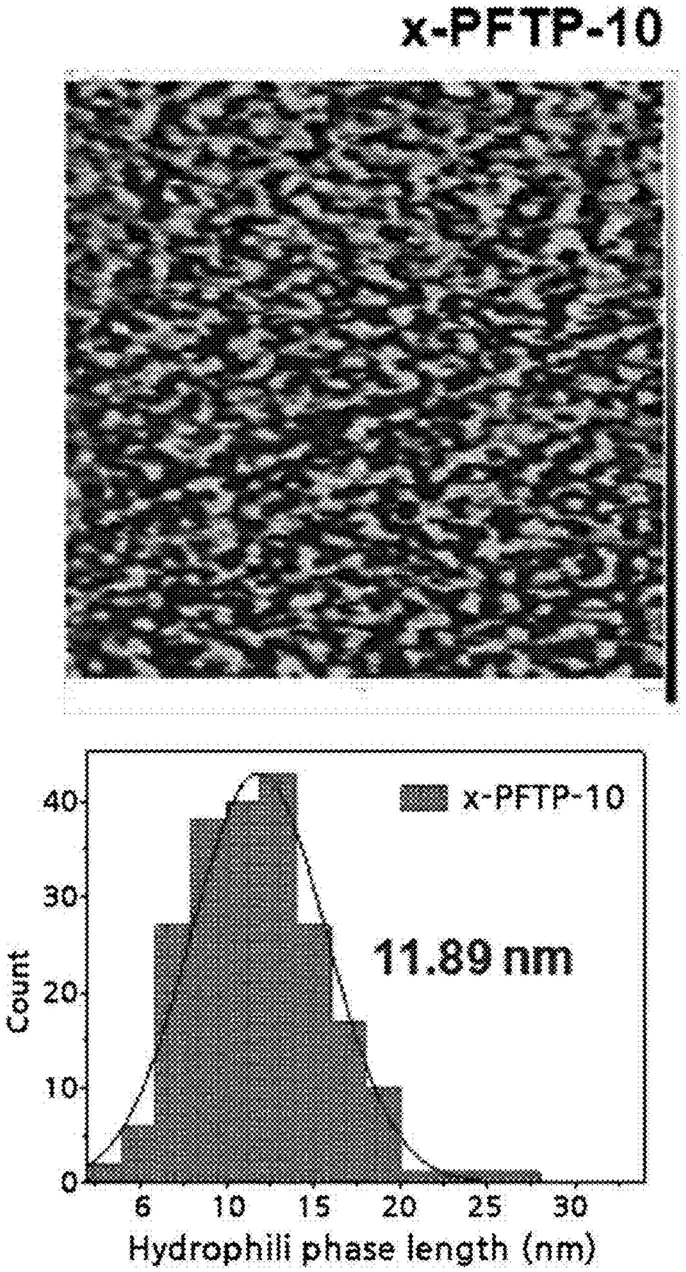
FIGS. 4A to 4D show the ion channel size and phase separation degree of anion exchange membranes prepared in Examples 1-3 and Comparative Example 2.
Figure 4B:
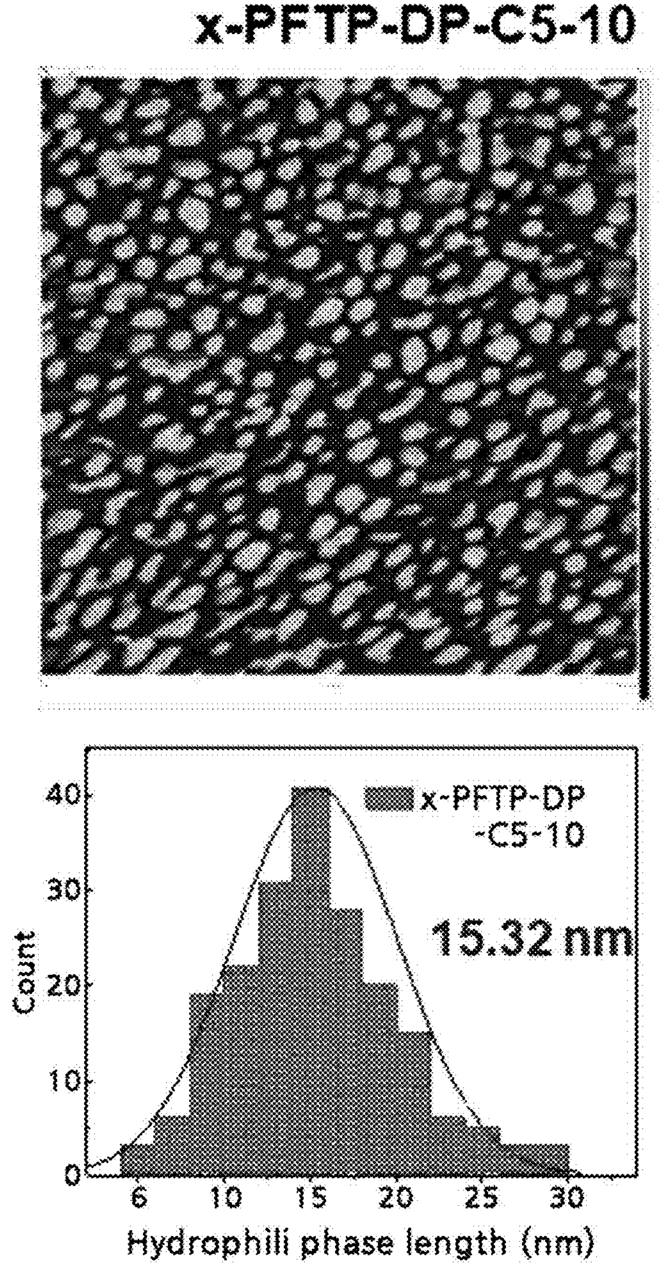
Figure 4C:
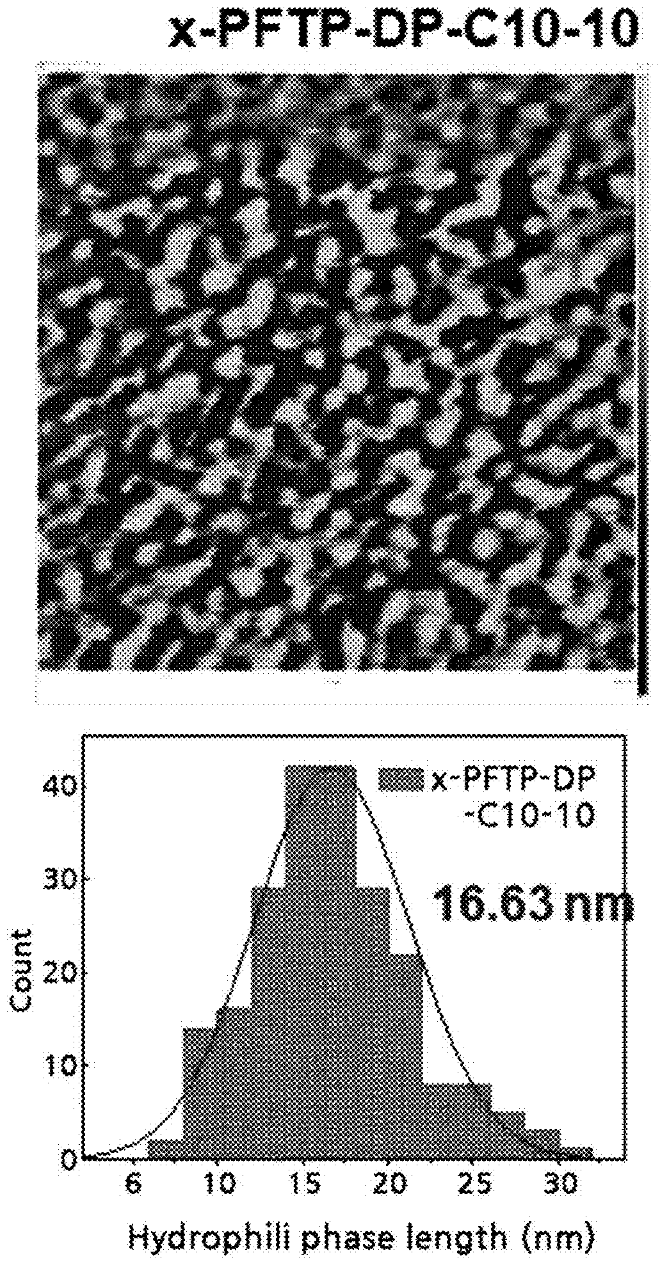
Figure 4D:
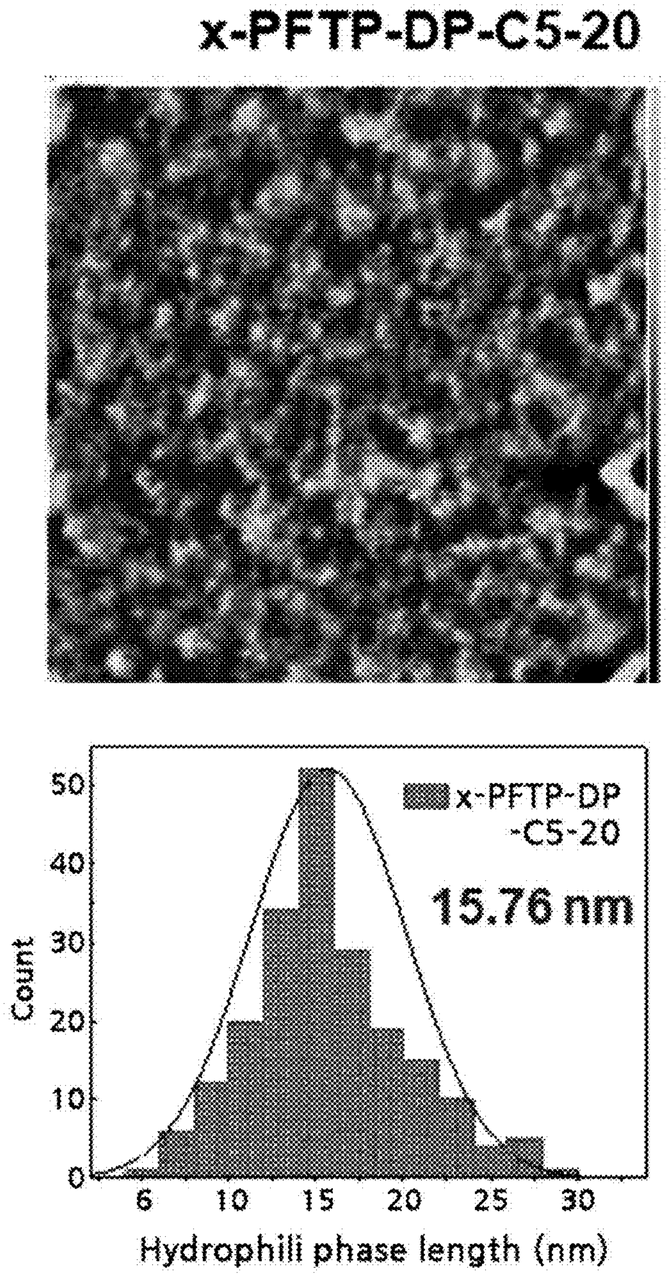

FIG. 3 shows the ionic conductivity of the anion exchange membranes prepared in Examples 1-3 and Comparative Examples 1-2, and Table 1 shows ion-exchange capacity (IEC) and ionic conductivity at 80° C.

TABLE 1

| Samples | IEC (meq $g^{-1}$) Exp. ($Cl^-$ form) | Theo. ($Cl^-$ form) | $OH^-$ conductivity (mS $cm^{-1}$) | $HCO_3^-$ conductivity (mS $cm^{-1}$) |
|---|---|---|---|---|
| PFTP | 2.64 | 2.78 | 162.60 | 67.34 |
| x-PFTP-10 | 2.67 | 2.81 | 145.45 | 58.26 |
| x-PFTP-DP-C5-10 | 2.82 | 2.95 | 163.08 | 72.10 |
| x-PFTP-DP-C5-20 | 2.88 | 3.00 | 142.85 | 61.30 |
| x-PFTP-DP-C10-10 | 2.78 | 2.90 | 165.34 | 69.34 |

As seen from FIG. 3 and Table 1, the ionic conductivity of the anion exchange membranes having a cross-linked structure was not decreased due to relatively high ion-exchange capacity. They exhibit similar or higher ionic conductivity under the normal fuel cell operating condition of 60-80° C.

In addition, since they exhibit superior $HCO_3^-$ conductivity, they are less sensitive to carbonation, which is the main problem of the existing anion exchange membranes.

FIGS. 4A to 4D show the ion channel size and phase separation degree of the anion exchange membranes prepared in Examples 1-3 and Comparative Example 2.

Due to the ionic group of the crosslinking agent, they have an ion channel size corresponding to about 1.5 times that of the anion exchange membrane having the cross-linked structure (Comparative Example 2) and also show about 40% of hydrophilic area due to superior phase separation degree.

Figure 5A:
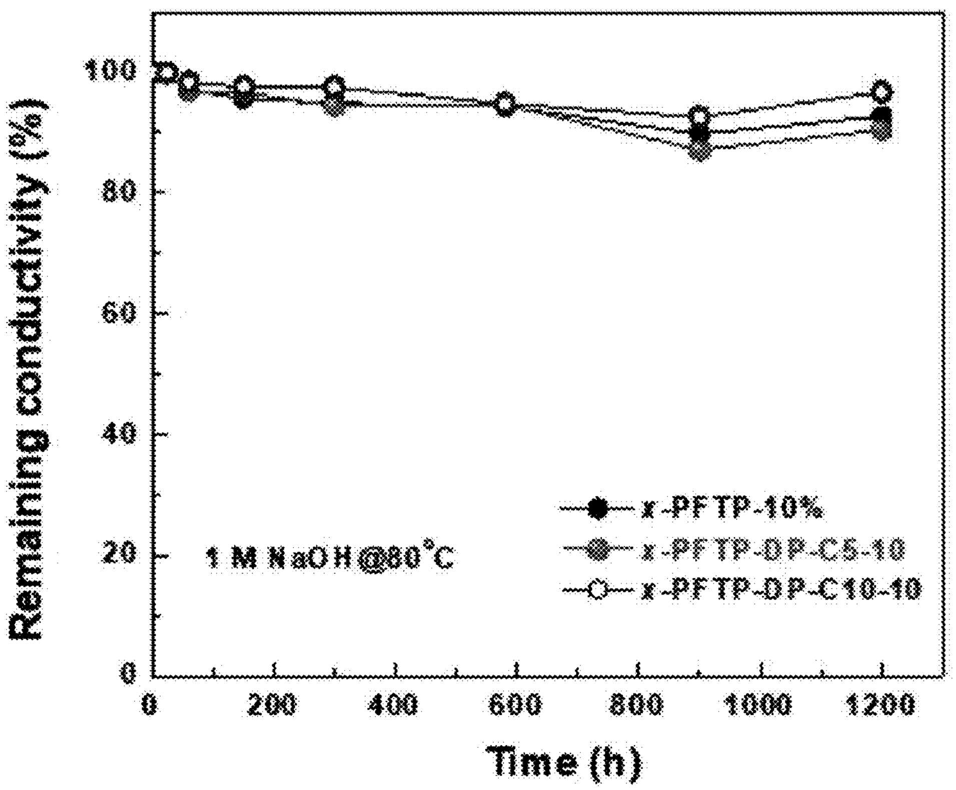
FIGS. 5A to 5D show a result of evaluating alkaline stability.
Figure 5B:
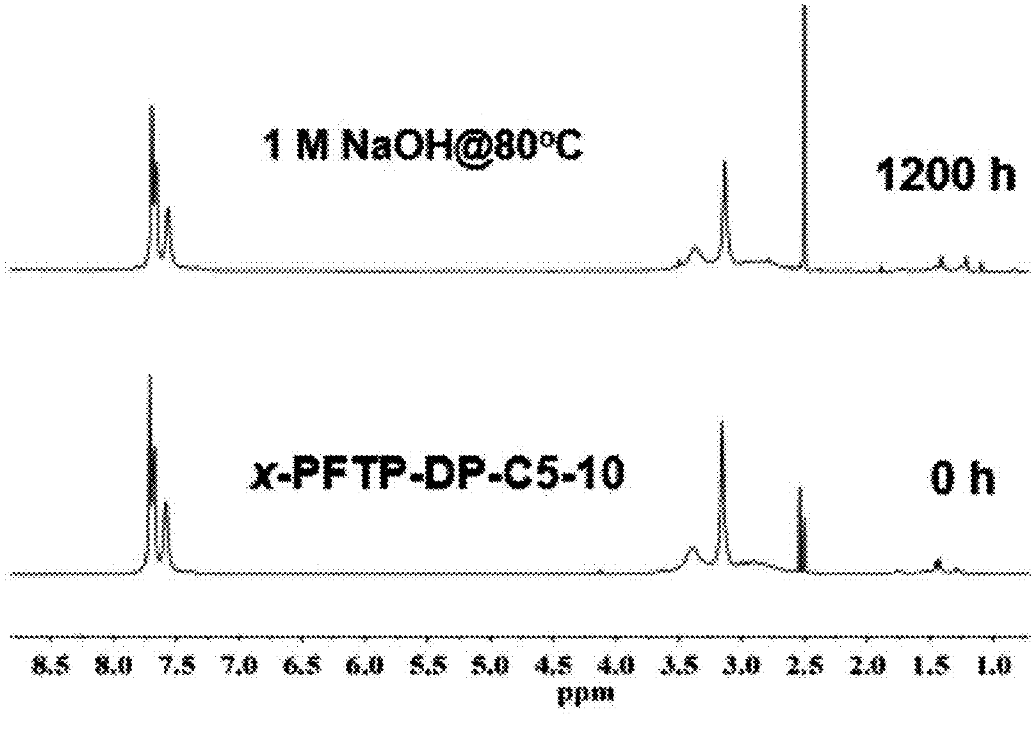
Figure 5C:
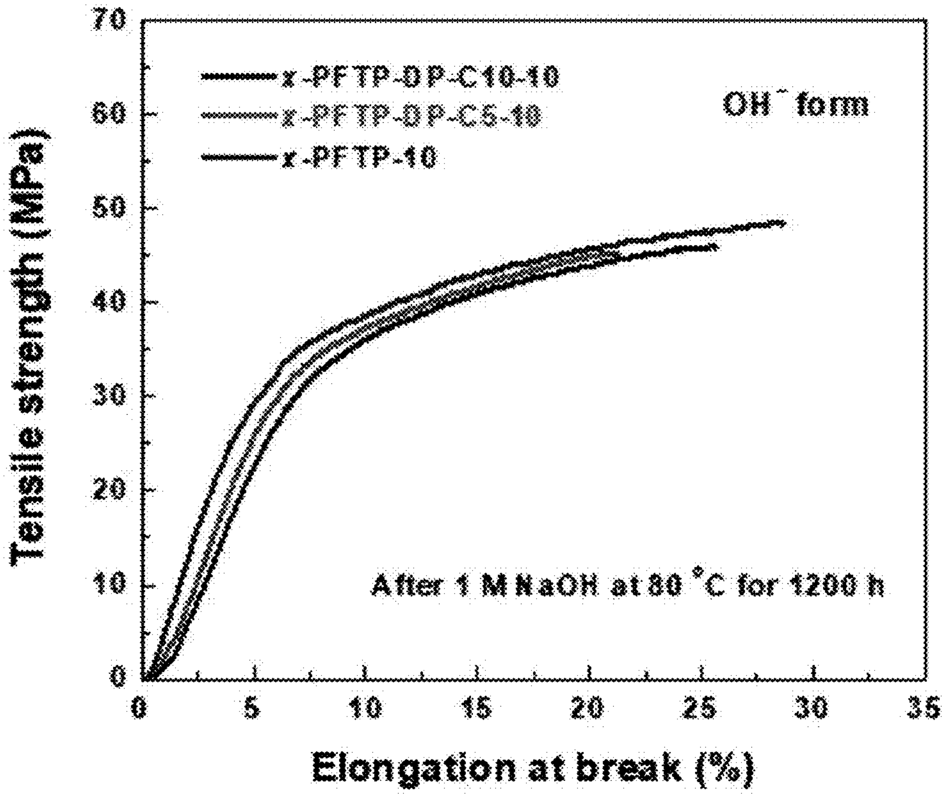
Figure 5D:
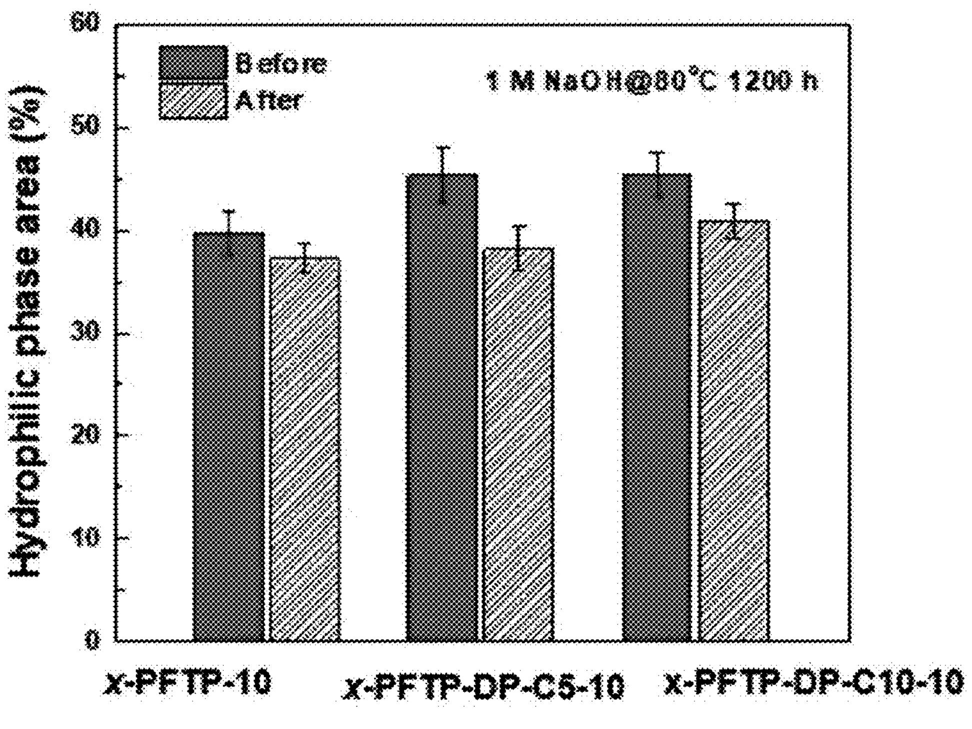
Figure 6A:
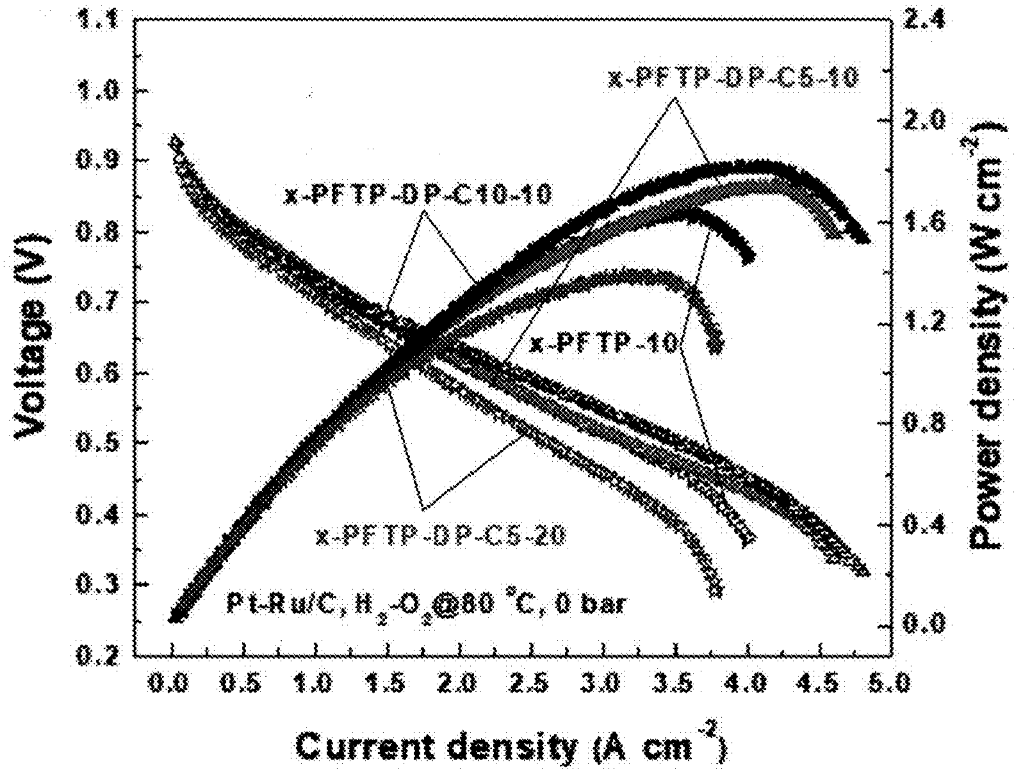
FIGS. 6A-6D show the fuel cell performance of anion exchange membranes prepared in Examples 1-3 and Comparative Example 2.
Figure 6B:
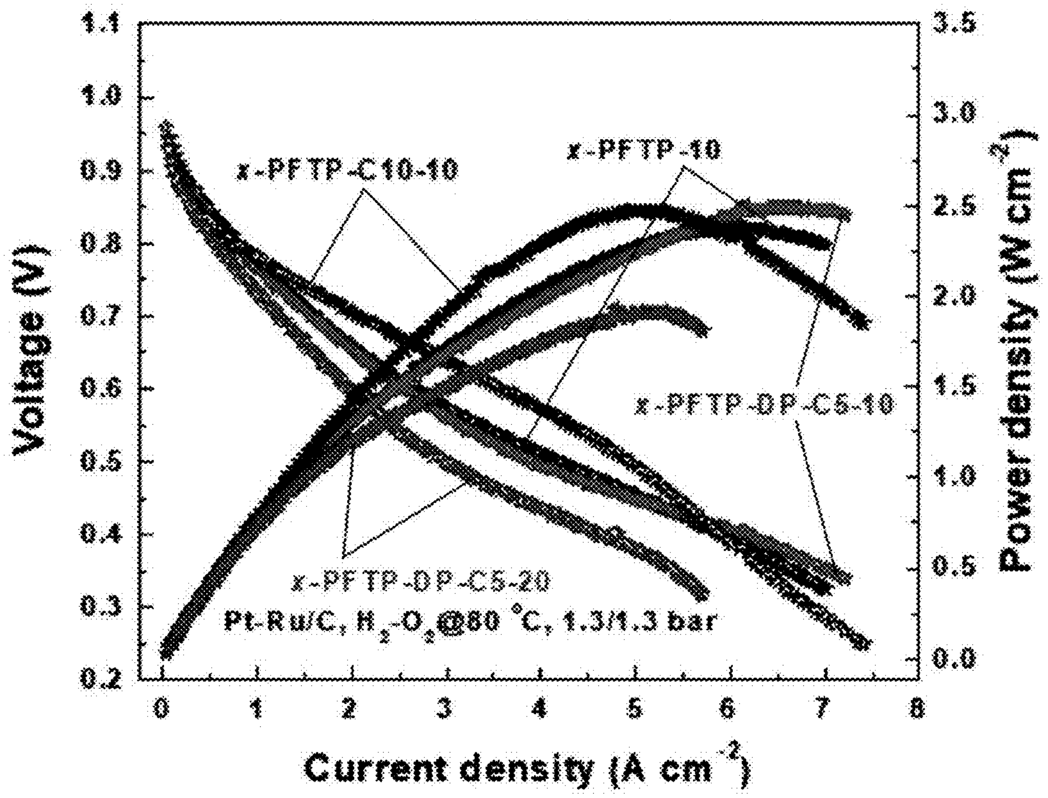
Figure 6C:
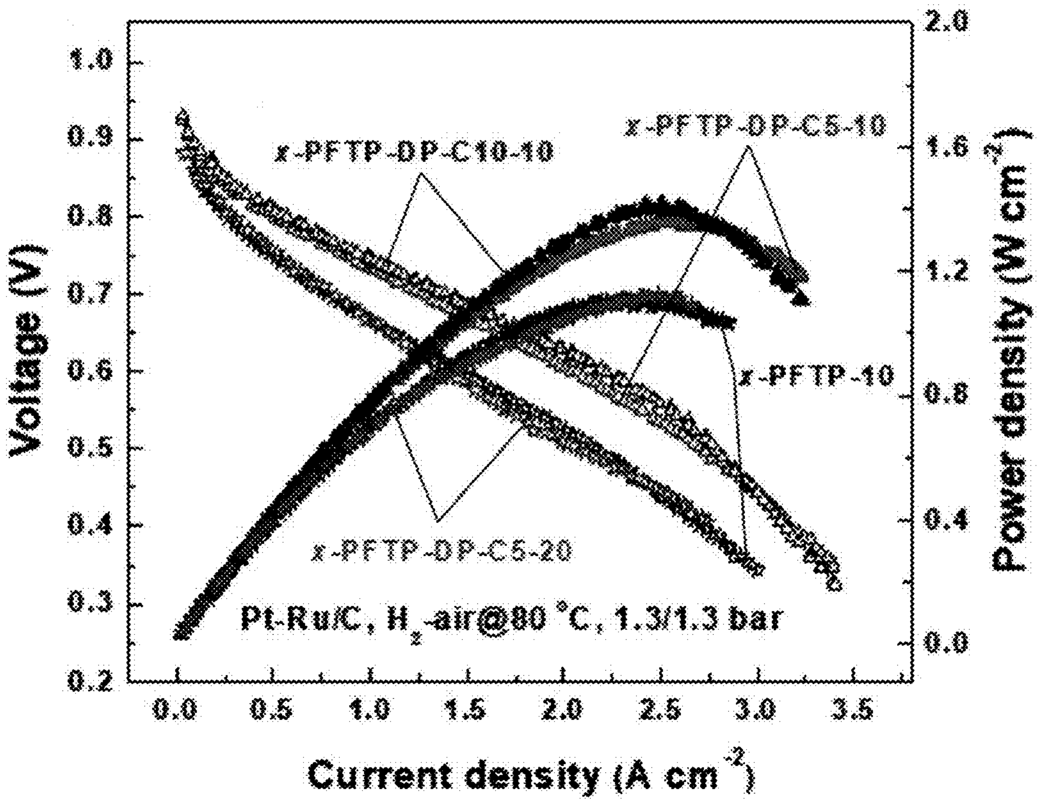
Figure 6D:
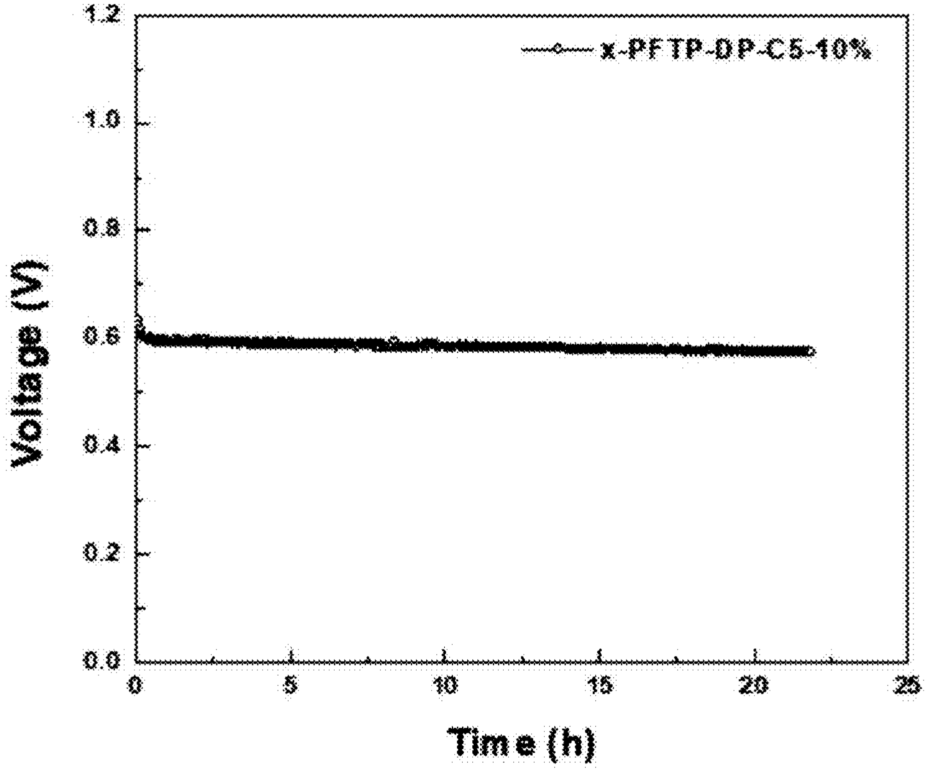

FIGS. 5A to 5D show a result of evaluating alkaline stability. FIG. 5A shows the remaining ionic conductivity of the anion exchange membranes prepared in Examples 1 and 3 and Comparative Example 2 after prolonged exposure to 80° C. in 1 M NaOH solutions, FIG. 5B shows 1H NMR spectrum of the anion exchange membrane prepared in Example 1 after exposure to 80° C. in a 1 M NaOH solution for 1200 hours, FIG. 5C shows the mechanical properties of the anion exchange membranes prepared in Examples 1 and 3 and Comparative Example 2 after exposure to 80° C. in 1 M NaOH solutions for 1200 hours, and FIG. 5D shows the phase separation degree of the anion exchange membranes prepared in Examples 1 and 3 and Comparative Example 2 before and after exposure to 80° C. in 1 M NaOH solutions for 1200 hours.

It can be seen that ionic conductivity is maintained at 90% or higher even after the exposure to 80° C. in 1 M NaOH solutions for 1200 hours or longer.

In addition, no new peak was observed in the 1H NMR analysis, suggesting that degradation did not occur in the alkaline environment.

Furthermore, about 80% of mechanical properties were maintained and, although the hydrophilic area was decreased slightly, they still exhibit superior phase separation degrees exceeding 40%.

FIGS. 6A-6D show the fuel cell performance of the anion exchange membranes prepared in Examples 1-3 and Comparative Example 2.

When PGMs (platinum-group metals) were used as electrode catalysts, they showed very superior performance of 1.8 W $cm^{-2}$ under $H_2$—$O_2$ (at 80° C., 0 bar) atmosphere and 2.5 W $cm^{-2}$ at 1.3 bar. They showed improved fuel cell performance as compared to the conventional membrane (2.3 W $cm^{-2}$).

In addition, they showed superior performance of 1.4 W $cm^{-2}$ even under $H_2$-air atmosphere due to superior $HCO_3^-$ conductivity.

Therefore, the anion exchange membrane having a cross-linked structure according to the present disclosure, which has a cross-linked structure containing at least one ammonium group, exhibits superior ion-exchange capacity, ionic conductivity, dispersed phase and mechanical properties and, thus, can achieve high power density and durability in an anion exchange fuel cell.

The invention claimed is:

1. A polyfluorene-based cross-linked copolymer, which is selected from copolymers having a cross-linked structure represented by <Chemical Formula 1> and <Chemical Formula 3> to <Chemical Formula 5>:

<Chemical Formula 1>

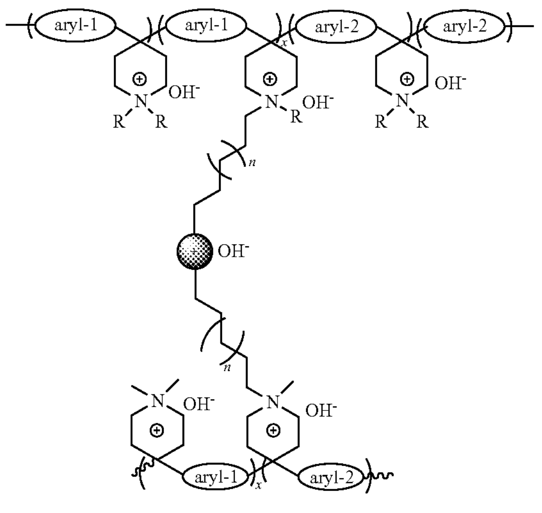

-continued

<Chemical Formula 3>

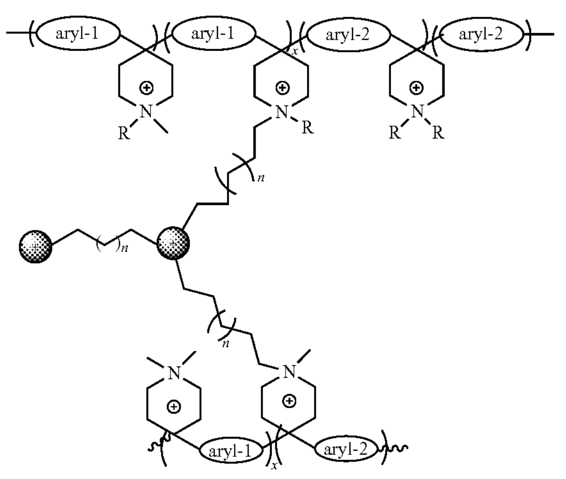

<Chemical Formula 4>

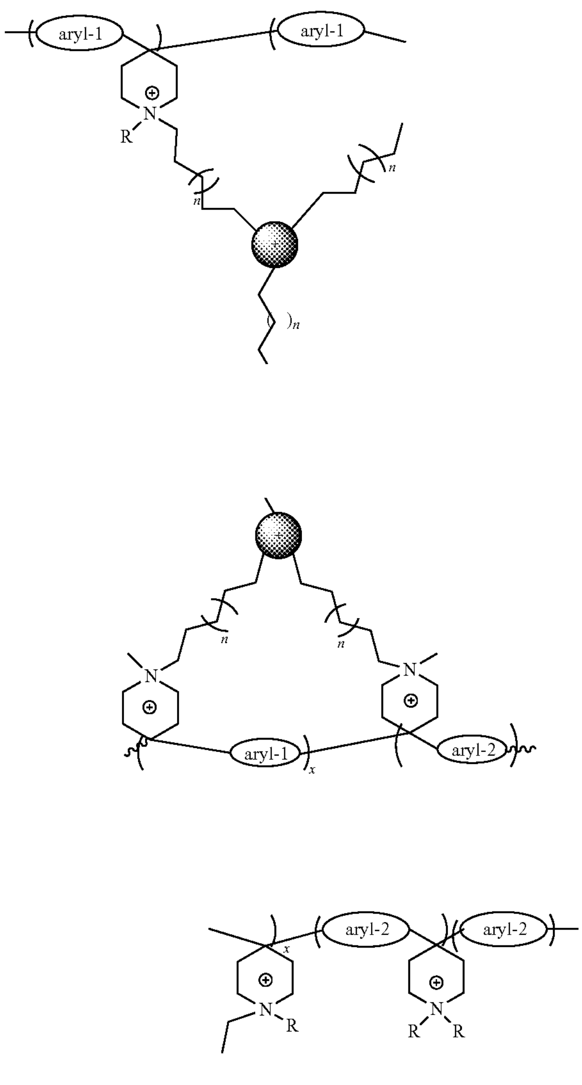

-continued

<Chemical Formula 5>

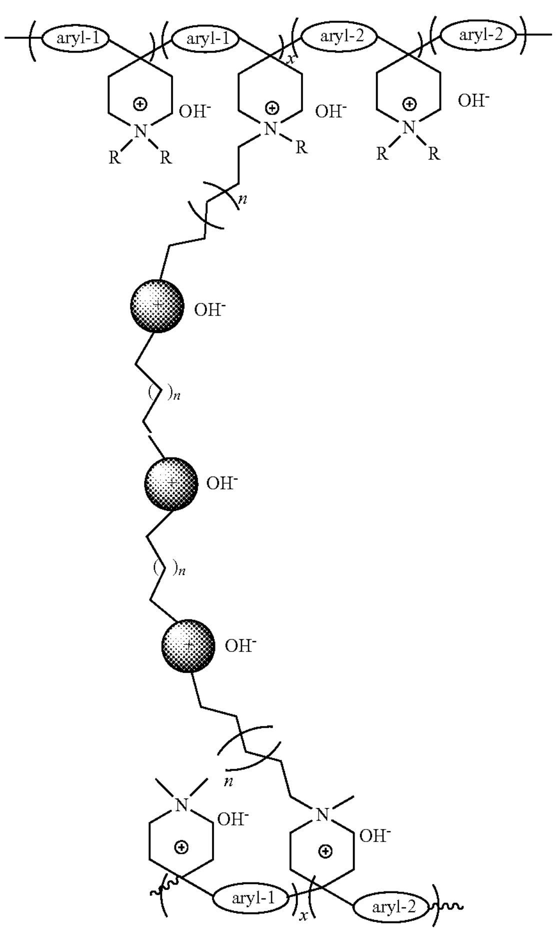

wherein each of aryl-1 and aryl-2 is independently selected from a group consisting of fluorenyl, phenyl, biphenyl, terphenyl and quaterphenyl, at least one of them being fluorenyl, R is H or $CH_3$, x indicates crosslinking degree,

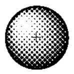

indicates an ammonium-based crosslinking agent, wherein the ammonium-based crosslinking agent is a multi-ammonium compound having at least one ammonium cation, and n is an integer from 1 to 15.

2. The polyfluorene-based cross-linked copolymer according to claim 1, wherein, the x is 5-20%.

3. A method for preparing the polyfluorene-based cross-linked copolymer of claim 1, comprising:

(I) a step of obtaining a polymer solution by dissolving a piperidine-introduced polyfluorene-based block copolymer in an organic solvent;

(II) a step of obtaining mixture solution by adding an ammonium-based crosslinking agent solution, which is a multi-ammonium compound having at least one ammonium cation, to the polymer solution and stirring the same;

(III) a step of forming a quaternary piperidinium salt by reacting the mixture solution with an excess amount of methyl iodide; and (IV) a step of obtaining a polymer in solid phase by precipitating, washing and drying the polymer solution with the quaternary piperidinium salt formed.

4. The method for preparing a polyfluorene-based cross-linked copolymer according to claim 3, wherein the organic solvent of the step (I) is N-methylpyrrolidone, dimethylacetamide, dimethyl sulfoxide or dimethylformamide.

5. A polyfluorene-based anion exchange membrane having a cross-linked structure, which is obtained from the polyfluorene-based cross-linked copolymer according to claim 1.

6. A method for preparing a polyfluorene-based anion exchange membrane having a cross-linked structure, comprising: (a) a step of obtaining a polymer solution by dissolving the polyfluorene-based cross-linked copolymer according to claim 1 in an organic solvent; (b) a step of obtaining a membrane by filtering the polymer solution, casting on a glass plate and then drying the same; and (c) a step of converting counterions to $OH^-$ ions by immersing the obtained membrane in a 1 M NaOH solution.

7. The method for preparing a polyfluorene-based anion exchange membrane having a cross-linked structure according to claim 6, wherein the organic solvent of the step (a) is N-methylpyrrolidone, dimethylacetamide, dimethyl sulfoxide or dimethylformamide.

8. The method for preparing a polyfluorene-based anion exchange membrane having a cross-linked structure according to claim 6, wherein the polymer solution of the step (a) has a concentration of 2-30 wt %.

9. The method for preparing a polyfluorene-based anion exchange membrane having a cross-linked structure according to claim 6, wherein the drying of the step (b) is performed by slowly removing the organic solvent in an oven at 80-90° C. for 24 hours and then completely removing the organic solvent by heating in a vacuum oven at 120-150° C. for 24 hours.

10. A membrane electrode assembly for an alkaline fuel cell, comprising the polyfluorene-based anion exchange membrane having a cross-linked structure according to claim 5.

11. An alkaline fuel cell comprising the polyfluorene-based anion exchange membrane having a cross-linked structure according to claim 5.

12. A water electrolysis device comprising the polyfluorene-based anion exchange membrane having a cross-linked structure according to claim 5.

* * * * *